United States Patent Office 2,793,122
Patented May 21, 1957

2,793,122

CHEESE AND PROCESSES OF PRODUCING CHEESE

Arthur Beau Erekson, Plymouth, Wis., assignor to The Borden Company, New York, N. Y., a corporation of New Jersey No Drawing. Application December 13, 1951, Serial No. 261,604

15 Claims. (Cl. 99—116)

This application is a continuation-in-part of my application Serial No. 207,832 filed January 25, 1951.

This invention relates to cheese and more particularly cheese having markedly improved flavor and processes of producing such cheese.

An object of this invention is to produce a high-flavored cheese economically and efficiently.

Another object of this invention is to accelerate the development and improve the flavor of cheese, such as cheddar cheese.

While the use of pasteurized milk for cheese making has afforded greater control and uniformity of product, cheese made from such pasteurized milk ripens slowly and even when mature lacks the flavor characteristics of cheese produced from raw milk [Biennial Review of the Progress of Dairy Science, Journal of Dairy Research 12–13, 1941–44, p. 376 (d)]. Pasteurized milk has many advantages over raw milk and these advantages in general outweigh the disadvantages of prolonged ripening and loss of flavor. Attempts have been made to counteract the disadvantages, but no totally satisfactory solution to the problem has been proposed heretofore.

In accordance with this invention, cheese from pasteurized milk is produced which has a markedly superior flavor and which ripens in a relatively shorter period of time than cheese produced from pasteurized milk by known processes. Raw milk may also be used as the starting material of the cheese of this invention and the resulting cheese, whether produced from raw or pasteurized milk, has a distinctive wholesome flavor. The cheese of this invention is produced by modifying the conventional method by which cheese is made in adding finely divided beef, hog or sheep kidney to the milk in the proportion of ¼ to 5 pounds, and preferably ¾ to 1½ pounds, of the finely divided kidney per 1000 pounds of milk. As an illustration of cheese produced by this invention, lactic starter is added to pasteurized or unpasteurized milk maintained at 75° to 104° F. to effect substantially complete ripening of the milk. Prior to setting, the finely divided kidney is added in the proportions specified, the milk is then set, the curd separated from the whey and the separated curd subsequently cured. If desired, further improvement in flavor is effected by adding with the finely divided kidney, proteolytic enzyme, or an active culture of *Streptococcus thermophilus* and an active culture of *Lactobacillus bulgaricus*, or both enzyme and culture. The amounts of these substances added per 1000 pounds of milk are 1 to 40 grams, and preferably 8 to 20 grams of proteolytic enzyme, 1 to 200 cc. and preferably 25 to 75 cc. of the active culture of *Streptococcus thermophilus* and 1 to 200 cc. and preferably 25 to 75 cc. of *Lactobacillus bulgaricus*.

After formation of the curd in the process heretofore described, the curd may be milled, or the curd may be stirred to produce a "granular" or "stirred-curd" cheese. A very satisfactory cheese similar to the cheddar type is produced in this manner. The finely divided kidney is preferably added to the milk along with or prior to addition of the lactic culture because the kidney stimulates growth of the starter organisms reducing the time of ripening, or permitting the use of somewhat smaller amounts of cultures. The enzymes are preferably added to the milk shortly before the rennet is added to set the curd, and the cultures of *Streptococcus thermophilus* and *Lactobacillus bulgaricus* can be added at any stage prior to addition of the rennet. These cultures are particularly beneficial in improving the flavor of cheese of the cheddar, stirred curd or Colby type.

A satisfactory procedure for preparing the kidneys for use in the production of cheese of this invention is to initially wash and substantially immediately freeze at −5° F. or lower freshly slaughtered kidneys, such as freshly slaughtered hog kidneys. The kidneys are maintained in the frozen condition until ready for use. When desired for use, which usually is three weeks or more to insure destruction of any pathogenic organisms that may be present, the kidneys are thawed, rinsed in chlorine solution to destroy surface contamination and then skinned and trimmed of all outside fatty tissues. They are then ground while still cold, preferably in an equal weight of freshly prepared skim milk, and then passed through homogenizers so that substantially all of the finely divided kidney is capable of passing through a 20-mesh sieve and preferably so that at least 95% is capable of passing through a 40-mesh sieve.

To facilitate the addition to the milk of the finely divided kidney and other materials that may be added simultaneously with the kidney in the production of cheese of this invention, the kidney and other materials may be mixed, quick-frozen and maintained in the frozen state until just prior to use. Such mixtures are produced by mixing 115 to 2000 parts, and preferably 350 to 700 parts, of hog, beef or sheep kidney; 25 to 500 parts, and preferably 80 to 175 parts, of reconstituted milk or lactic starter culture; 1 to 200 parts, and preferably 25 to 75 parts, of *Lactobacillus bulgaricus*; 1 to 200 parts, and preferably 25 to 75 parts, of *Streptococcus thermophilus*; and 1 to 40 parts, and preferably 8 to 20 parts of proteolytic enzyme. All parts specified are by weight. The mixture is homogenized until the mixture shows no evidence of visible lumps and more particularly until substantially all of the mixture is capable of passing through a 20-mesh sieve and desirably until at least 95% of the material is capable of passing through a 40-mesh sieve. The mixture is then packaged in suitable containers, such as polyethylene plastic bags, preferably in quantities sufficient to add to 1000 pounds of milk, such as a 625 grams package, and subjected to a quick freeze. The packaged mixture is maintained at a temperature at about −5° F. or lower, until a few hours before using it to add to the milk to be made into cheese.

Instead of the procedure heretofore described for preparing the kidney, the kidney, such as pork kidney may be frozen to a temperature below about −50° F. with a suitable material, such as liquid nitrogen or solid carbon dioxide (Dry Ice) and then passed through a comminuting machine which produces a fine powder even finer than that obtained with an homogenizer. It is important that sufficient liquid nitrogen, Dry Ice or like material be used to insure that the temperature during grinding does not exceed 20° F. since at that temperature thawing takes place which materially prevents the production of the finely powdered kidney. It has been found that it is desirable to reduce the temperature of the kidney to about −50° F. or below to prevent difficulties in grinding. If the temperature of the kidney is much higher than about −50° F., the friction of grinding causes thawing to take place and the holes in the screen of the comminuting machine become clogged so that further grinding is impossible.

The resulting powder produced by Dry Ice or like material resembles flour as long as it is kept frozen. It may be packed in convenient containers, such as polyethylene bags desirably in quantities which are sufficient to produce a batch of cheese in accordance with this invention. For example, nine pounds of such comminuted kidney may be packaged in a polyethylene bag and the packaged material added to a 10,000 pound batch of milk in the production of cheese of this invention. If this alternative procedure of freezing with Dry Ice and comminuted when so frozen is followed, any other desired ingredients, such as lactic acid starter, *Lactobacillus bulgaricus, Streptococcus thermophilus* and proteolytic enzyme are added separately instead of being incorporated in a mixture with the kidney as heretofore described. In the practice of this alternative procedure, the two cultures *L. bulgaricus* and *S. thermophilus*, if desired to be added, are prepared in sterile skim milk, and after sufficient growth has been obtained, they are frozen and held in this condition until just prior to the addition to the milk in the production of cheese of this invention.

The powdered kidney utilizing Dry Ice or like material may be produced from frozen hog kidneys which are held at —5° F. usually for three weeks or more. Such frozen kidneys are taken to a room for processing, which is maintained at 10–20° F. Blocks of the whole frozen kidney are run through a riving machine which breaks them into irregular pieces which average about ¾" in diameter. Dry Ice, which is also broken up in the same machine, is mixed with the kidneys at the rate of ½ lb. to 1 lb. of kidney. This mixture is ground through a comminuting machine fitted with a coarse screen (¼" diameter holes.) Additional Dry Ice is added at the rate of about ½ lb. per 1 lb. of comminuted kidneys, and the mixture is again processed through the machine, which this time has been fitted with a fine screen having holes 1/32" in diameter. This second grinding produces a flour-like material which is kept frozen until used in the cheese-making process.

The flavor of the cheese produced in accordance with this invention is markedly improved by the addition of the finely divided kidney in its production. When pasteurized milk is used as the starting material in the production of cheese of this invention, the phosphatase value is appreciably increased as a result of the addition of the finely divided kidney. For example, the finely divided kidney increases the phosphatase value of pasteurized milk cheese, which is 3 or less per 0.25 gram, to 15 units per 0.25 gram of cheese. The period of curing for the attainment of the desired flavor of the cheese of this invention is also substantially less than that of similar type cheese produced by known methods. This reduction in curing time is particularly striking in a comparison of cheddar cheese produced from pasteurized milk by known methods with cheddar type cheese produced from pasteurized milk in accordance with this invention. As much as six months may be saved in the time of curing of cheddar type cheese of this invention in the attainment of comparable flavor intensity of cheddar cheese produced from pasteurized milk by known methods.

The rate of curing of certain cheese, such as cheddar type cheese, is accelerated by the addition of the proteolytic enzyme in its production. Some proteolytic enzymes, such as papain, trypsin and ficin, while effecting accelerated curing, may be undesirable to use because the resulting cheese has a bitter taste. Desirably the proteolytic enzymes used for this purpose are the proteolytic enzymes sold under the trade or proprietary names, Rhozyme P–11, and Protease 15, and manufactured by Rohm and Haas, Philadelphia, Pennsylvania. Neither of these proteolytic enzymes adversely affects the flavor of the resulting cheese. Both Rhozyme P–11 and Protease 15 hydrolyze proteins to peptides and amino acids in the pH range of 5.5 to 8.5 with very effective activity at 50° C. within the pH range of 6.5 to 7.5. If Rhozyme P–11 and Protease 15 are used as the proteolytic enzymes, 1 to 20 grams and preferably 4 to 10 grams of each enzyme are added per 1000 pounds of milk treated. The Rhozyme P–11 and Protease 15 are in powdered form, and they may be mixed with three or four volumes of water just prior to their addition to the milk. The Rhozyme P–11 and the Protease 15 cause a cheddar type cheese of six months old to be comparable in body characteristics to one a year old, all other factors being the same. This characteristic is particularly desirable when coupled with the advantages resulting from the use of finely divided kidney in the production of the cheese.

The *Streptococcus thermophilus* and *Lactobacillus bulgaricus* which may be added to the milk are produced from cultures developed in sterile skim milk. The culture of *Streptococcus thermophilus* has a titratable acidity expressed as lactic acid between 0.5 and 0.8%, while that of *Lactobacillus bulgaricus* has a titratable acidity expressed as lactic acid between 0.8 and 1.5%. *Streptococcus thermophilus* produces a pleasing sweet flavor in cheese when added in the proportion of 1 cc. to 200 cc. per 1000 pounds of milk. The *Lactobacillus bulgaricus* when added in the same proportion produces an intensified cheese flavor which is not noticeable until the cheese has cured for several weeks.

A more comprehensive understanding of this invention is obtained by reference to the following examples:

*Example 1.—Cheddar type cheese*

To 1,000 lbs. of pasteurized milk adjusted to about 88° F. is added about 0.75% of regular starter in the usual way to ripen the milk. At the time the starter is added, 400 grams of finely divided hog kidney, 50 cc. of an active culture of *Streptococcus thermophilus* and 50 cc. of an active culture of *Lactobacillus bulgaricus* are added. 30 to 60 minutes later, or when the milk has reached the desired ripeness, 4 grams of Rhozyme P–11 and 4 grams Protease 15 mixed with 40 cc. of cold water are added followed by the addition of about 3 oz. of commercial rennet to bring about coagulation of the milk. Within thirty minutes, a curd is formed and this curd is then cut with ¼" curd knives. After slow agitation for about 20 minutes, the curd and whey are heated gradually to about 102° F. and held at this temperature until the curd is of the proper firmness and the whey tests about .16% as lactic acid. The whey is drained from the curd and the curd is piled and matted in the usual way until the pH of the curd is between 5.15 and 5.40. The curd is then milled into about 1" cubes and salted so that the percent of salt in the finished cheese is between 1.5 and 2.0. The salted curd is then pressed into forms. After pressing is complete, the finished cheese may be dipped in paraffin or covered with a suitable moisture-proof wrapper. It is then held at a suitable curing temperature within the range from 34° F. to 65° F. until the desired amount of flavor is developed.

The finely divided hog kidney used in the production of the cheese of this example is obtained from hog kidneys taken from freshly slaughtered hogs. The kidneys are frozen within a few hours after taking them from the animal and maintained at —5° F. or lower, preferably for at least three weeks to destroy possible undesirable living organisms. They are then thawed and the excess fat is trimmed from each kidney. The kidneys are ground twice through a food chopper and then treated mechanically in a colloid mill or homogenizer to reduce the material to minute-particle size and to release the enzyme content of the tissue. The particle size is sufficiently fine so that at least 95% of the product is capable of passing through a 40-mesh sieve. The required amount of the finely divided kidney may be mixed with the required amounts of the cultures of *Streptococcus thermophilus* and *Lactobacillus bulgaricus* and the protolytic enzymes, Rhozyme P-11 and Protease 15. The mixture may, if desired, be again frozen and stored for future use or it may be used immediately. In any event, the mixture must be handled so that deterioration does not take place and so that the enzyme content is not destroyed. The ingredients may be also added to the milk separately if desired.

The cheddar type cheese produced in accordance with this example is comparable in intensity to cheddar cheese prepared from raw milk. Yet, the flavor of the cheese of this example is superior to that prepared from raw milk because bacteria which are contained in raw milk and which often produce undesirable flavors, are destroyed in pasteurization and are consequently not contained in the pasteurized milk from which the cheese of this example was produced. In addition, the cheddar type cheese of this example when cured at 60° F. for five months has a flavor intensity and solubility equivalent to raw-milk cheese cured at 34° F. for 2 years. When a test for trytophane, one of the breakdown products developed during cheese curing, is conducted, the tryptophane found in the cheese of this example after curing for five months at 60° F. is equivalent to the amount of that in the raw-milk cheese cured for two years at 34° F. This comparison is most striking in view of the experience with cheddar cheese produced from pasteurized milk by known methods. This experience has shown that it requires about one and one-half times the period of curing of pasteurized milk cheese to attain the same flavor intensity as the raw-milk cheese.

*Example 2.—Swiss type cheese*

Milk, which may be pasteurized or clarified or both or which may be warmed to approximately 96° F. and which is contained in a vat, is subjected to the action of harmless lactic-acid producing bacteria present in such milk or added thereto. Harmless propionic acid bacteria may also be added. Six hundred and eight (608) grams of a mixture of finely divided beef kidney and skim milk are then added for every 1,000 lbs. of milk contained in the vat. This mixture consists of 304 grams of finely divided beef kidney, homogenized sufficiently fine so that 95% is capable of passing through a 40-mesh sieve, mixed with 304 grams of skim milk, or to obtain added flavor it may consist of 300 grams of finely divided beef kidney, 100 grams of *S. lactus* or skim milk, 100 grams (about 100 cc.) of an active culture of *Lactobacillus bulgaricus*, 100 grams (about 100 cc.) of an active culture of *Streptococcus thermophilus*, 4 grams of the proteolytic enzyme known as Rhozyme P-11, and 4 grams of a proteolytic enzyme known as Protease 15. The latter preparation may be mixed and processed together or each ingredient may be added separately. The finely divided beef kidney and the mixture of enzymes are produced in the same manner as described in Example 1.

After the mixture containing the kidney has been added, sufficient rennet (with or without purified calcium chloride in quantities not more than 0.02 percent, calculated as anhydrous calcium chloride, of the weight of the milk) is added to set the milk to a semi-solid mass. The mass is cut into particles similar in size to wheat kernels. For about 30 minutes the particles are alternately stirred and allowed to settle. The temperature is raised to about 126° F. Stirring is continued until the curd becomes firm. The acid of the whey at this point, calculated as lactic acid, does not exceed 0.13 percent. The curd is transferred to hoops or forms and pressed until the desired shape and firmness are obtained. The cheese is then salted by immersing in a saturated salt solution for about three days. It is then held at a temperature of about 50° F. for a period of five to ten days, after which it is held at a temperature of about 70 to 75° F. until it is approximately thirty days old or until the so called "eyes" are formed. The cheese is then stored at a lower temperaure for further curing and aging.

The addition of the finely divided kidney brings about an increase in the rate of curing so that the cheese is ready for market at an eariler date than if no kidney had been added to the milk.

*Example 3.—Camembert type cheese*

Milk, which may be pasteurized or clarified or both or which may be warmed and which is contained in a vat, is subjected to the action of harmless lactic-acid producing bacteria or other harmless flavor-producing bacteria present in such milk or added thereto. Six hundred and eight (608) grams of a mixture of finely divided sheep kidney and skim milk are then added for every 1,000 lbs. of milk contained in a vat. The mixture consists of 304 grams of finely divided sheep kidney, homogenized sufficiently fine so that 95% is capable of passing through a 40-mesh sieve, mixed with 304 grams of skim milk, or to obtain added flavor it may consist of 300 grams of finely divided sheep kidney, 100 grams of *S. lactus* or skim milk, 100 grams (about 200 cc.) of an active culture of *Lactobacillus bulgaricus*, 100 grams (about 200 cc.) of an active culture of *Streptococcus thermophilus*, 4 grams of a proteolytic enzyme known as Rhozyme P-11 and 4 grams of a proteolytic enzyme known as Protease 15. The latter preparation may be mixed and processed together or each ingredient may be added separately. The finely divided kidney and the mixture of enzymes are produced in the same manner as described in Example 1.

After the mixture containing the kidney has been added, sufficient rennet (with or without purified calcium chloride in quantities of not more than 0.02 percent, calculated as anhydrous calcium chloride, of the weight of the milk) is added. After coagulation, the mass is so treated as to promote the separation of whey and curd. Such treatment may include one of the following: cutting, stirring, heating, dilution with water or brine. The whey or part of it is drained off, and the curd is collected and shaped. It may be placed in forms and may be pressed. The surface of the cheese is inoculated with a suspension of mold spores of *Penicillium camemberti*. When sufficient acid has developed in the curd, salt is applied to the surface. After the salt has been absorbed, the cheese is placed under conditions suitable for development of mold on the surface of the cheese and the curing is conducted so that the cheese cures from the surface toward the center. These conditions include careful regulation of the temperature at approximately 50° F. and control of the humidity at approximately 85%. After three weeks of curing, the cheese is removed from the shelves and wrapped in a suitable material for packaging for the retail trade.

When the finely divided sheep kidney has been added to the milk for the preparation of the cheese, the rate of curing is increased and the flavor is enhanced.

The terms and expressions which I have employed are used as terms of description and not of limitation, and I have no intention, in the use of such terms and expressions, of excluding any equivalents of the features described or portions thereof, but recognize that various modifications are possible within the scope of the invention claimed.

I claim:

1. In the process of producing cheese which includes the steps of adding a starter and rennet to milk to form cheese curd, the step of adding to the milk, finely divided kidney selected from the class consisting of beef kidney, hog kidney and sheep kidney in the proportion of ¼ to 5 pounds of kidney to 1000 pounds of milk.

2. In the process of producing cheese which includes the steps of adding a starter and rennet to milk to form cheese curd, the step of adding to the milk, finely divided kidney selected from the class consisting of beef kidney, hog kidney and sheep kidney in the proportion of ¾ to 1½ pounds of kidney to 1000 pounds of milk.

3. In the process of producing cheese from pasteurized milk which includes the steps of adding a starter and rennet to the milk to form cheese curd, the step of adding to the milk prior to the addition of the rennet, finely divided hog kidney in the proportion of ¼ to 5 pounds of hog kidney to 1000 pounds of ripened milk.

4. In the process of producing American cheese from pasteurized milk which includes the steps of adding a starter and rennet to the milk to form cheese curd, the step of adding to the milk prior to the addition of the rennet, finely divided hog kidney in the proportion of ¾ to 1½ pounds of hog kidney to 1000 pounds of ripened milk.

5. The process of producing cheese comprising adding to milk maintained at a temperature of 75° to 104° F. lactic starter to effect substantially complete ripening of the milk, adding to the milk prior to the addition of rennet finely divided kidney selected from the class consisting of beef kidney, hog kidney and sheep kidney in the proportion of ¼ to 5 pounds of kidney per 1000 pounds of milk treated, forming a curd, separating the curd from the whey and milling the separated curd.

6. The process of producing cheese comprising adding to milk maintained at a temperature of 75° to 104° F. lactic starter to effect substantially complete ripening of the milk, adding to the milk prior to the addition of rennet finely divided kidney selected from the class consisting of beef kidney, hog kidney and sheep kidney in the proportion of ¾ to 1½ pounds of kidney per 1000 pounds of milk treated, forming a curd, separating the curd from the whey and milling the separated curd.

7. The process of producing cheese comprising adding to milk maintained at a temperature of 74° to 104° F. lactic starter to effect substantially complete ripening of the milk, adding to the milk finely divided hog kidney in the proportion of ¼ to 5 pounds of hog kidney per 1000 pounds of milk treated, forming a curd, separating the curd from the whey and milling the separated curd.

8. The process of producing cheese comprising adding to milk maintained at a temperature of 74° to 104° F. lactic starter to effect substantially complete ripening of the milk, adding to the milk finely divided hog kidney in the proportion of ¾ to 1½ pounds of hog kidney per 1000 pounds of milk treated, forming a curd, separating the curd from the whey and milling the separated curd.

9. The process of producing cheese comprising adding to milk maintained at a temperature of 75° to 104° F. lactic starter to effect substantially complete ripening of the milk, adding to the milk finely divided kidney selected from the class consisting of beef kidney, hog kidney and sheep kidney in the proportion of ¼ to 5 pounds of kidney per 1000 pounds of milk treated, forming a curd and stirring the resulting curd to form a stirred-curd cheese.

10. The process of producing cheese comprising adding to milk maintained at a temperature of 75° to 104° F. lactic starter to effect substantially complete ripening of the milk, adding to the milk finely divided kidney selected from the class consisting of beef kidney, hog kidney and sheep kidney in the proportion of ¾ to 1½ pounds of kidney per 1000 pounds of milk treated, forming a curd and stirring the resulting curd to form a stirred-curd cheese.

11. The process of producing cheese comprising adding to pasteurized milk maintained at a temperature of 74° to 104° F. lactic starter to effect substantially complete ripening of the milk, adding and uniformly distributing throughout the milk proteolytic enzyme and finely divided kidney selected from the class consisting of beef kidney, hog kidney and sheep kidney in the proportions per 1000 pounds of milk treated of 1 to 40 grams of proteolytic enzyme and ¼ to 5 pounds of kidney, forming a curd, separating the curd from the whey, salting and curing the curd.

12. The process of producing cheese comprising adding to pasteurized milk maintained at a temperature of 74° to 104° F. lactic starter to effect substantially complete ripening of the milk, adding and uniformly distributing throughout the milk proteolytic enzyme and finely divided kidney selected from the class consisting of beef kidney, hog kidney and sheep kidney in the proportions per 1000 pounds of milk treated of 8 to 20 grams of proteolytic enzyme and ¾ to 1½ pounds of kidney, forming a curd, separating the curd from the whey, salting and curing the curd.

13. The process of producing cheese of the cheddar type comprising adding to pasteurized milk maintained at a temperature of about 74° to 104° F. lactic starter to effect substantially complete ripening of the milk, adding to and uniformly distributing throughout the milk an aqueous dispersion of finely divided hog kidney, an active culture of *Streptococcus thermophilus*, an active culture of *Lactobacillus bulgaricus*, proteolytic enzyme and protease in the proportions per 1000 pounds of milk treated of ¼ to 5 pounds of hog kidney, 1 cc. to 200 cc. of *Streptococcus thermophilus*, 1 cc. to 200 cc. of *Lactobacillus bulgaricus* and 1 g. to 40 g. of proteolytic enzyme, adding rennet to the resulting product to set the curd, cutting the curd, slowly agitating the mixture of curd and whey, heating the mixture, maintaining the mixture at an elevated temperature until the whey tests about 0.16% as lactic acid, drawing the whey from the curd, piling and matting the curd until the pH thereof is between 5.15 and 5.40 and milling and salting the curd.

14. A preparation for use in the production of cheese comprising 115 to 2000 parts of kidney selected from the class consisting of hog kidney, beef kidney and sheep kidney, 25 to 500 parts of a member selected from the class consisting of reconstituted skim milk and lactic starter culture, 1 to 200 parts of *Lactobacillus bulgaricus*, 1 to 200 parts of *Streptococcus thermophilus* and 1 to 40 parts of proteolytic enzyme.

15. A preparation for use in the production of cheese comprising 350 to 700 parts of kidney selected from the class consisting of hog kidney, beef kidney and sheep kidney, 80 to 175 parts of a member selected from the class consisting of reconstituted skim milk and lactic starter culture, 25 to 75 parts of *Lactobacillus bulgaricus*, 25 to 75 parts of *Streptococcus thermophilus* and 8 to 20 parts of proteolytic enzyme.

References Cited in the file of this patent

UNITED STATES PATENTS

| | | |
|---|---|---|
| 2,199,816 | Flosdorf | May 7, 1940 |
| 2,322,148 | Lane et al. | June 15, 1943 |
| 2,370,879 | Roundy et al. | Mar. 6, 1945 |
| 2,494,636 | Stine | Jan. 17, 1950 |
| 2,531,329 | Farnham | Nov. 21, 1950 |

OTHER REFERENCES

"Chemistry and Technology of Enzymes," by Tauber, John Wiley and Sons., Inc., New York, 1949, pp. 33, 34, 126, 127, 151 and 431–436.